United States Patent
Pourghassemi Najafabadi et al.

(10) Patent No.: US 11,620,510 B2
(45) Date of Patent: Apr. 4, 2023

(54) PLATFORM FOR CONCURRENT EXECUTION OF GPU OPERATIONS

(71) Applicant: Samsung Electronics Co., Ltd., Suwon-si (KR)

(72) Inventors: Behnam Pourghassemi Najafabadi, Irvine, CA (US); Joo Hwan Lee, San Jose, CA (US); Yang Seok Ki, Palo Alto, CA (US)

(73) Assignee: SAMSUNG ELECTRONICS CO., LTD.

( * ) Notice: Subject to any disclaimer, the term of this patent is extended or adjusted under 35 U.S.C. 154(b) by 782 days.

(21) Appl. No.: 16/442,440

(22) Filed: Jun. 14, 2019

(65) Prior Publication Data
US 2020/0234115 A1    Jul. 23, 2020

Related U.S. Application Data

(60) Provisional application No. 62/796,071, filed on Jan. 23, 2019.

(51) Int. Cl.
*G06N 3/08*    (2006.01)
*G06N 3/04*    (2023.01)
(Continued)

(52) U.S. Cl.
CPC ............. *G06N 3/08* (2013.01); *G06F 9/5016* (2013.01); *G06F 9/5027* (2013.01); *G06F 17/15* (2013.01);
(Continued)

(58) Field of Classification Search
None
See application file for complete search history.

(56) References Cited

U.S. PATENT DOCUMENTS 5,745,652 A     4/1998 Bigus
7,606,807 B1 *  10/2009 Sobel .................. G06F 16/10
                                                 711/131
(Continued)

OTHER PUBLICATIONS

Hu, Yitao et al. "Olympian: Scheduling GPU Usage in a Deep Neural Network Model Serving System", Proceedings of the 19th International Middleware Conference, 2018, 13 pages.

(Continued)

*Primary Examiner* — Adam Lee
(74) *Attorney, Agent, or Firm* — Renaissance IP Law Group LLP

(57) ABSTRACT

Computing resources may be optimally allocated for a multipath neural network using a multipath neural network analyzer that includes an interface and a processing device. The interface receives a multipath neural network. The processing device generates the multipath neural network to include one or more layers of a critical path through the multipath neural network that are allocated a first allocation of computing resources that are available to execute the multipath neural network. The critical path limits throughput of the multipath neural network. The first allocation of computing resources reduces an execution time of the multipath neural network to be less than a baseline execution time of a second allocation of computing resources for the multipath neural network. The first allocation of computing resources for a first layer of the critical path is different than the second allocation of computing resources for the first layer of the critical path.

16 Claims, 6 Drawing Sheets

(51) Int. Cl.
- *G06F 9/50* (2006.01)
- *G06F 17/15* (2006.01)
- *G06N 3/082* (2023.01)
- *G06N 3/10* (2006.01)

(52) U.S. Cl.
CPC ........... *G06N 3/0454* (2013.01); *G06N 3/082* (2013.01); *G06N 3/10* (2013.01)

(56) References Cited

U.S. PATENT DOCUMENTS

| | | | | |
|---|---|---|---|---|
| 8,627,331 | B1* | 1/2014 | Grunwald | H04L 67/1087 718/106 |
| 9,443,192 | B1* | 9/2016 | Cosic | G06N 5/048 |
| 10,970,630 | B1* | 4/2021 | Aimone | G06N 3/04 |
| 2004/0119958 | A1* | 6/2004 | Van De Nieuwelaar | G03F 7/70716 250/548 |
| 2005/0105658 | A1* | 5/2005 | Haratsch | H03M 13/03 375/348 |
| 2006/0253677 | A1* | 11/2006 | Bull | G06F 9/3836 712/E9.047 |
| 2007/0094529 | A1* | 4/2007 | Lango | G06F 9/52 714/4.1 |
| 2008/0071755 | A1* | 3/2008 | Barsness | G06F 16/284 |
| 2010/0312762 | A1* | 12/2010 | Yan | G06F 9/505 707/716 |
| 2013/0254477 | A1* | 9/2013 | Swanson | G06F 3/061 711/112 |
| 2014/0133574 | A1* | 5/2014 | Lee | H04N 19/60 375/240.18 |
| 2014/0270554 | A1* | 9/2014 | Matsumura | H04N 19/172 382/233 |
| 2015/0220420 | A1* | 8/2015 | Boneti | G06F 11/3419 714/37 |
| 2015/0339570 | A1 | 11/2015 | Scheffler | |
| 2016/0164537 | A1* | 6/2016 | Pisek | H03M 13/6362 714/755 |
| 2016/0233930 | A1* | 8/2016 | Zhou | H04L 25/03891 |
| 2017/0177993 | A1* | 6/2017 | Draelos | G06N 3/0454 |
| 2018/0039884 | A1* | 2/2018 | Dalton | G06N 3/0454 |
| 2018/0041442 | A1* | 2/2018 | Jones-McFadden | H04L 41/22 |
| 2018/0091815 | A1* | 3/2018 | Banerjee | H04N 19/70 |
| 2018/0113649 | A1* | 4/2018 | Shafiee Ardestani | G11C 13/0002 |
| 2018/0259608 | A1* | 9/2018 | Golden | G06N 3/02 |
| 2018/0285727 | A1* | 10/2018 | Baum | G06N 3/02 |
| 2018/0308006 | A1 | 10/2018 | Atkinson | |
| 2019/0005684 | A1* | 1/2019 | De Fauw | G06K 9/6271 |
| 2019/0044883 | A1* | 2/2019 | Jurski | G06F 9/5005 |
| 2019/0114533 | A1* | 4/2019 | Ng | G06N 3/063 |
| 2019/0244100 | A1* | 8/2019 | Seo | G06N 3/0454 |
| 2019/0294928 | A1* | 9/2019 | Zhang | G06V 10/82 |
| 2020/0034696 | A1* | 1/2020 | Wang | G06N 3/08 |
| 2020/0042856 | A1* | 2/2020 | Datta | G06N 3/063 |
| 2021/0159916 | A1* | 5/2021 | Maunder | H03M 13/6502 |

OTHER PUBLICATIONS

Mayer, Ruben et al., "The TensorFlow Partitioning and Scheduling Problem: It's the Critical Path!", Proceedings of the 1st Workshop on Distributed Infrastructures for Deep Learning, 2017, 6 pages.

Office Action for U.S. Appl. No. 16/442,447, dated Sep. 14, 2022.

Sheikh, Hafiz Fahad et al., "An Evolutionary Technique for Performance-Energy-Temperature Optimized Scheduling of Parallel Tasks on Multi-Core Processors", IEEE Transactions on Parallel and Distributed Systems, vol. 27, No. 3, Mar. 2016, pp. 668-681.

Notice of Allowance for U.S. Appl. No. 16/442,447, dated Feb. 13, 2023.

* cited by examiner

Baseline

10% less memory

20% less memory

PLATFORM FOR CONCURRENT EXECUTION OF GPU OPERATIONS

CROSS-REFERENCE TO RELATED APPLICATION

This application claims the priority benefit under 35 U.S.C. § 119(e) of U.S. Provisional Application No. 62/796,071, filed on Jan. 23, 2019, the disclosure of which is incorporated herein by reference in its entirety. Additionally, this application is being filed concurrently with U.S. patent application Ser. No. 16/442,447, the disclosure of which is incorporated by reference in its entirety.

TECHNICAL FIELD

The subject matter disclosed herein relates to neural networks. More specifically, the subject matter disclosed herein relates to a system and a method for allocating computing resources to different layers in different paths of a multipath neural network.

BACKGROUND

A typical graphic processing unit (GPU) platform does not allow concurrent execution of GPU operations. In order to launch multiple operations concurrently on a typical GPU, each operation must be assigned to a separate executor, that is, a separate stream in the CUDA programming model. It is, however, nearly impossible to run two or more GPU kernels concurrently for most of popular GPU kernels. The popular kernels occupy all GPU core resources (including registers and shared memory) and do not allow a GPU scheduler to execute blocks from another kernel on the same core. Current GPU platforms rely on a number of blocks for scheduling and concurrent execution of other GPU operation may only be possible when the number of blocks is low. Because most GPU kernels typically have enough numbers of blocks to occupy all available GPU cores, execution of another GPU kernel is postponed until after the first kernel is completed resulting in a sequential execution of the two operations. Thus, current GPU platforms utilize 100% of device (e.g. GPU) cores for an individual layer (kernel), thereby preventing concurrent execution of independent kernels.

Another weakness associated with current GPU platforms is inefficient resource utilization. While GPU kernels may be optimized for performance on specific inputs and GPU microarchitectures, the computational efficiency and DRAM utilization are not sufficiently optimized for multiple GPU algorithms for some inputs. For example, the execution time of some convolutions (mainly GEMM-based) saturate with a limited number of cores and executing the convolutions on additional cores results in an underutilization the cores. By running multiple operations concurrently, underutilized resources in one GPU operation may be used for another GPU operation taking into consideration the algorithm, input data, data layout and microarchitecture.

Yet another weakness associated with current GPU platforms is that existing GPU platforms execute operations sequentially in the order of how a GPU device receive operations, which has been prioritized to reduce the latency of an earlier-requested operation. Such a scheduling approach may increase the average latency of GPU operations for multiple applications. For example, if a GPU operation that takes a considerable amount of time to complete arrives at a GPU device before another GPU operation that takes less time to complete arrives, the latency (or response time) of the second-in-time GPU operation becomes unnecessarily long.

Still another weakness associated with current GPU platforms is current GPU platforms are not optimized for workloads having multiple paths. GPU workloads may form a directed acyclic graph (DAG) in which each node represents an operation and a directed edge from a node A to a node B represents an input-output dependency between nodes A and B; that is, node B must be executed after node A. In recent years, GPU workloads having multi-path computation graphs have become common. A multi-path workload may occur from different GPU applications launched by a single user, by multiple users sharing the GPU platform, or by a single GPU application having multiple paths. A multipath neural network is an example of a single GPU application having multiple paths.

Multipath neural networks have gained significant attention in the machine learning (ML) community by being a better representation of real world ML problems. Generally, for neural network paths in parallel, there will be one path that may be referred to as a critical path that limits the throughput of the overall neural network. Signal flow through a neural network may be characterized as a signal flow through a sequence of dependent layers. Typically, as neural networks are executed, the layers are executed in a sequential iteration in which the input to a given layer depends on the output of an immediately previous layer in the sequence.

Current deep-learning frameworks are not configured to optimize execution of multipath neural networks based on resource allocation between the different paths or kernels running the different paths. Inefficient memory allocation may prevent concurrent execution of kernels of a multipath neural network if the total workspace memory that is needed to execute a kernel is larger than available memory on a device executing the neural network. Inefficient computing resource allocation in a critical path of a multipath neural network may adversely impact the throughput of the overall neural network.

SUMMARY

An example embodiment provides a multipath neural network that may include two or more paths through the multipath neural network in which a first path may include one or more layers. The first path may be a critical path through the multipath neural network that limits throughput of the multipath neural network. A first layer of the critical path may be allocated a first allocation of computing resources that are available to execute the multipath neural network. The first allocation of computing resources reducing an execution time of the multipath neural network to be less than a baseline execution time of a second allocation of computing resources for the multipath neural network. The first allocation of computing resources for the first layer may be different than the second allocation of computing resources for the first layer. In one embodiment, the first allocation of computing resources for the first layer may be allocated prior to execution the multipath neural network. In another embodiment, the first allocation of computing resources for the first layer may be allocated during execution of the multipath neural network.

An example embodiment provides a method to allocate resources to layers of a multipath neural network that may include: determining a baseline execution time for a multipath neural network based on a first computing-resource allocation of computing resources to the multipath neural network that are available to execute the multipath neural network, the multipath neural network comprising a two or more paths through the multipath neural network; iteratively determining an execution time for the two or more paths through the multipath neural network for one or more second computing-resource allocations for the two or more paths, each second computing-resource allocation being different from the first computing-resource allocation; and identifying a second computing-resource allocation for a first layer in a first path that provides an overall execution time for the multipath neural network that is less than an overall baseline execution time for the multipath neural network.

An example embodiment provides a multipath neural network analyzer that may include an interface and a processing device. The interface may receive a multipath neural network that may include two or more paths through the multipath neural network and a first path of the two or more paths may include one or more layers. The processing device may generate the multipath neural network to include one or more layers of a critical path through the multipath neural network that may be allocated a first allocation of computing resources that are available to execute the multipath neural network. The critical path may limit throughput of the multipath neural network. The first allocation of computing resources may reduce an execution time of the multipath neural network to be less than a baseline execution time of a second allocation of computing resources for the multipath neural network. The first allocation of computing resources for a first layer of the critical path may be different than the second allocation of computing resources for the first layer of the critical path.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
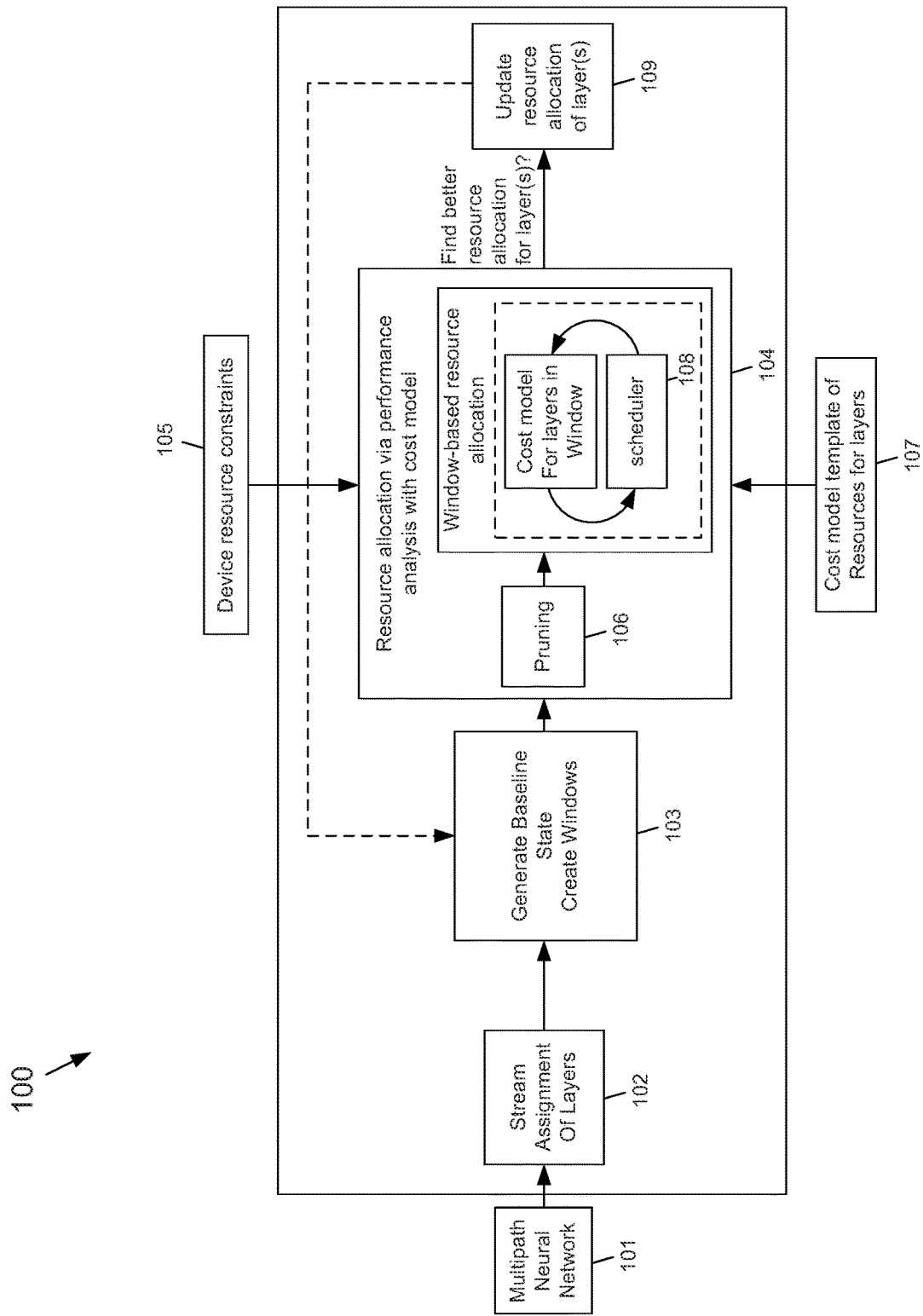
FIG. 1 depicts a functional block diagram of a multipath neural network analyzer that optimizes allocation or partitioning of computing resources to the different layers in different paths of a multipath neural network according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

The subject matter disclosed herein relates to a system and a method for efficiently allocating, or partitioning, computing resources between kernels concurrently executing on a single GPU device. The system disclosed herein may schedule concurrent and/or simultaneous execution of multiple GPU operations on a single GPU device by core allocation and/or core redistribution. An application programming interface (API) to the system allows a user to select GPU operations that are to be scheduled concurrently and to allocate computing resources for the concurrent operations.

The system and method disclosed herein may be used to allocate computing resources to optimize performance of a multipath neural network. In one embodiment, concurrent execution may be enabled for different layers in different paths of a multipath neural network. Auto optimization of multipath neural network applications may be provided based on a causal resource profiling technique. In one embodiment, the causal resource profiling technique may provide automatic performance optimization of a multipath neural network. Optimal resource allocation may be identified based on a relationship between a computing resource and an execution time of a layer in the neural network that is affected by the level of allocation of the computing resource.

Additionally, causal resource profiling may be based on a critical path through a multipath neural network and a relationship between a computing resource and an execution time associated with the computing resource. A cost model template may be used for performance analysis and one or more heuristics may be used to reduce complexity of an analysis to determine an optimal resource allocation. Additionally, a scheduling of execution of a multipath neural network application may be optimized using the causal resource profiling technique.

The resource allocation technique disclosed herein may allocate computing resources between layers of a multipath neural network to improve a performance result of the overall neural network. Network performance may be analyzed based on modifications in resource utilization for the layers of the multipath neural network, and resource utilization of individual layers may be updated or reconfigured if a performance analysis indicates a performance improvement based on a particular computing resource allocation.

The subject matter disclosed herein provides a programming interface that may partition computing resources between kernels. Unlike a current GPU platform having limited programmer support for concurrent execution and that relies on the number of thread blocks being executed for determining the number of GPU cores for a kernel, the subject matter disclosed herein provides a programming interface in which the programmer may define concurrently executing GPU operations and the resource allocation for the concurrent operations.

Both static and dynamic resource allocations may be supported by the system and method disclosed herein. For a static allocation, resources may be assigned to individual layers before an application is executed. For dynamic allocations, resources may be assigned during run-time to provide flexibility based on network changes, such as changes in topology, inputs, batch size, etc.

FIG. 1 depicts a functional block diagram of a multipath neural network analyzer 100 that optimizes allocation or partitioning of computing resources to the different layers in different paths of a multipath neural network according to the subject matter disclosed herein. In one example embodiment, the analyzer 100 may be implemented as a data-processing system executing suitable software. The analyzer 100 may receive multipath neural network 101 as an input for execution using computing resources that are available to the analyzer 100. The multipath neural network 101 may be a full-precision trained neural network. Alternatively, the multipath neural network 101 may be a neural network being trained. The analyzer 100 may analyze the different layers in the different paths of the multipath neural network 101 using causal resource profiling and determine an optimal allocation or partitioning of computing resources so that the multipath neural network 101 executes, or runs, in a minimal amount of time.

In one embodiment, the analyzer 100 may generate an optimized allocation of computing resources for one or more layers of one or more paths of the multipath neural network prior to the multipath neural network being executed. The optimized allocation of the computing resources is then used as the neural network is run. In another embodiment, the analyzer 100 may optimize parameters defining the computing resources for one or more layers of one or more paths of the multipath neural network associated with the neural network so that when the neural network is instantiated on a computing device, the optimized configuration of the neural network is executed. In still another embodiment, the analyzer 100 may dynamically update allocation of computing resources for one or more layers of one or more paths of the multipath neural network during execution of the multipath neural network to provide flexibility based on network changes, such as changes in topology, inputs, batch size, etc.

Initially at 102 in FIG. 1, the analyzer 100 assigns a corresponding stream to different paths of the neural network 101 that have one or more sequentially dependent layers. At 103, the analyzer 100 generates a baseline resource allocation state. A window, or grouping, size may additionally be generated to reduce the complexity of performing a causal resource profile for different allocations of computing resources, as described in connection with FIG. 5. At 104, the analyzer 100 may perform a performance analysis of different computing-resource allocations to determine an optimal computing-resource allocation. Device resource constraints 105 may be received from a user input that place constraints and/or bounds on available computing resources. The resource constraints 105 may be received from a user prior to receiving the multipath neural network at 101. The performance analysis may also use the window, or grouping, size generated at 103. The number of different computing-resource allocations that are analyzed may be reduced at 106 by pruning, or discarding, computing-resource allocations that likely will not provide an optimal performance solution. A cost model 107 may be used during the performance analysis.

A scheduler 108 may simulate portions of the different layers and paths being analyzed and/or an overall throughput performance of the neural network 101 being analyzed. At 109, as better computing-resource allocations are determined for the different layers and/or paths and better scheduling allocation is determined for the neural network 101, the analyzer 100 updates the baseline resource allocation of layers at 103 with the better allocation and the better scheduling allocation will be used when the neural network 101 runs.

In operation, the analyzer 100 receives device resource constraints 105 through an application programming interface (API) that allows a user to selectively set constraints on the computing resources that may be available to execute the multipath neural network. In one embodiment, the minimum number and/or maximum of cores of a processing unit or compute unit may be user selectable for one or more kernels running a path of the multipath neural network on the processing unit. Table 1 sets forth an example of a modified kernel-launching function that may be used in the OpenCL programming framework that may provide resource constraints, such as a minimum and a maximum number of cores that may be used for a kernel according to the subject matter disclosed herein. The clEnqueueNDRangeKernel kernel-launching command may be modified to include, for example, two additional arguments: a "min_cores" argument and a "max_cores argument." In particular, a "const cl_uint_min_cores" argument and a "const cl_uint_max_cores" are added to the clEnqueueNDRangeKernel kernel-launching command of the OpenCL framework. The two additional parameter setting arguments appear at the end of the argument list for the clEnqueueNDRangeKernel kernel-launching command.

The "min_cores" argument may be used to define a minimum number of cores of a processing unit that are utilized for a kernel when running with other kernels, and the "max_cores" argument may be used to define a maximum number of cores of a processing unit that are utilized for a kernel when running alone. A user may define a number of cores that are to be utilized for a kernel regardless of the number of thread blocks of the kernel.

TABLE 1

A modified kernel-launching function.

cl_int clEnqueueNDRangeKernel ( cl_command_queue command_queue,
    cl_kernel kernel,
    cl_uint work_dim,
    const size_t *global_work_offset,
    const size_t *global_work_size,
    const size_t *local_work_size,
    cl_uint num_events_in_wait_list,
    const cl_event *event_wait_list,
    cl_event *event,
    const cl_uint min_cores,
    const cl_uint max_cores)

Figure 2A:
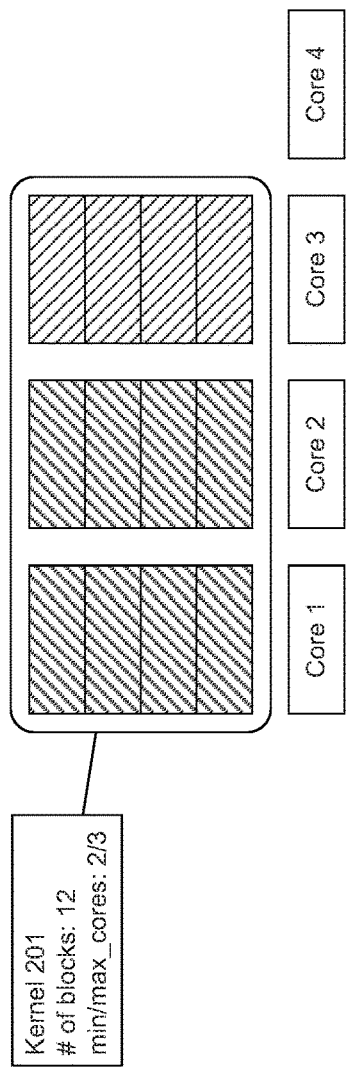
FIG. 2A depicts a processing unit, such as a GPU, having four cores on which multiple GPU operations have been scheduled concurrently using, for example, the modified kernel-launching function according to the subject matter disclosed herein.

FIG. 2A depicts a processing unit, such as a GPU, having four cores 1-4 on which multiple GPU operations have been scheduled concurrently using, for example, the modified kernel-launching function according to the subject matter disclosed herein. Initially, the modified kernel-launching function is used to set the min/max core arguments for kernel 201 to be 2/3. For this example, the kernel 201 may have 12 thread blocks that execute on GPU cores 1-4 that are distributed on cores 1-3 as depicted in FIG. 2A.

Figure 2B:
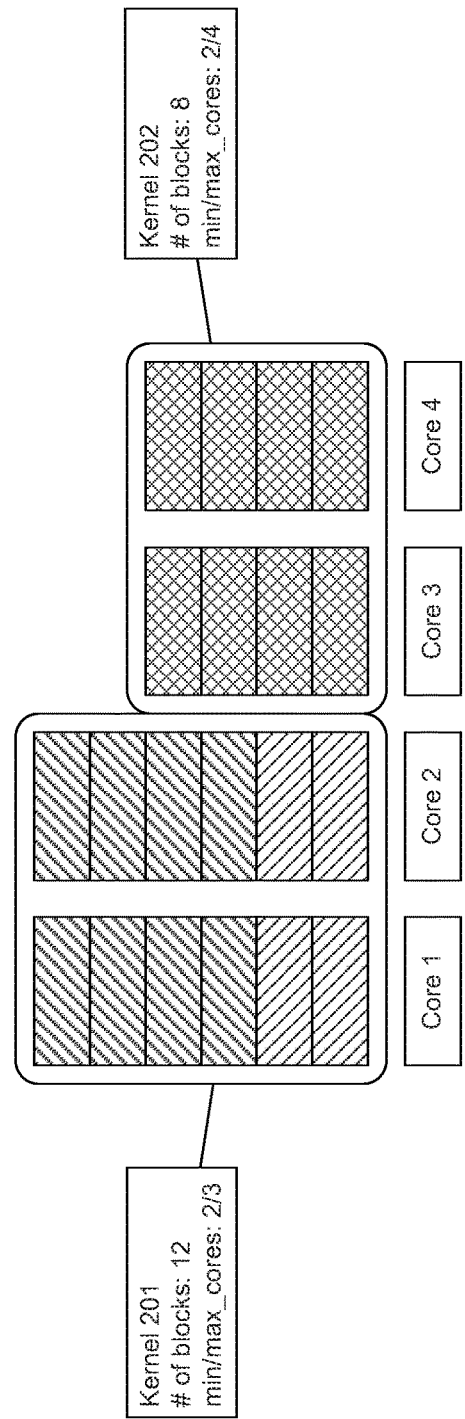
FIG. 2B depicts the GPU after a second kernel has been launched using the modified kernel-launching function according to the subject matter disclosed herein.

A second kernel 202 may be configured to have min/max core arguments set to be 2/4. As depicted in FIG. 2B, when the kernel 202 is launched on the GPU device, a GPU scheduler (not shown) performs thread-block migration so that the thread blocks of kernel 201 that were previously allocated on core 3 are migrated to cores 1 and 2 based on the min/max arguments for both the previously executing kernel 201 and the newly executing kernel 202. In this case, both kernels have a minimum core argument of 2, which sets a minimum of two GPU cores to run each of kernels 201 and 202. The different cores 1-4 may run different numbers of thread blocks. Additionally, the particular cores may be allocated differently that depicted in FIGS. 2A and 2B.

Based on the device constraints 105 input by a user, the analyzer 100 may use causal resource profiling to determine optimal computing resource allocation or partitioning to execute the multipath neural network 101. In one embodiment, causal resource profiling may be performed on a critical path through the multipath neural network 101 to identify how changes in the allocation of computing resources affect, for example, execution time through the critical path. Causal resource profiling may also be used to identify how changes in the allocation of computing resources in different paths of the multipath neural network may affect the overall execution time of the neural network.

Figure 3:
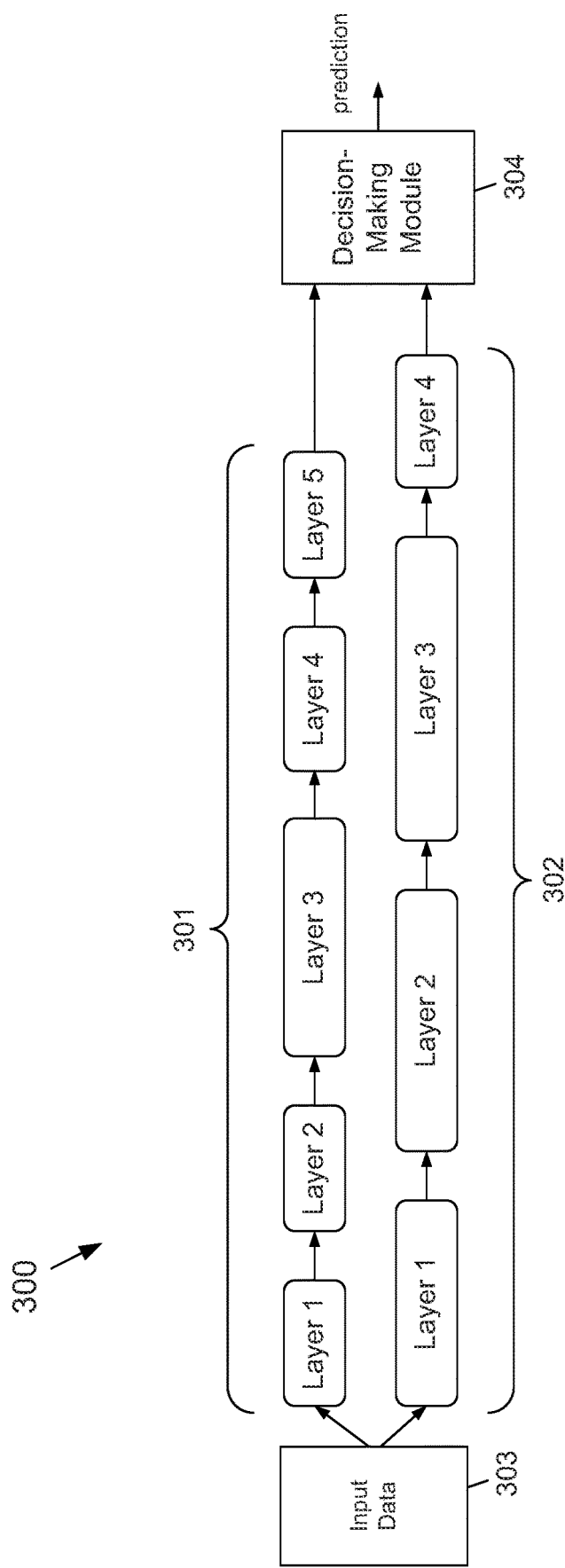
FIG. 3 depicts an example multipath neural network having two paths between an input and a decision-making block.

FIG. 3 depicts an example multipath neural network 300 having two paths 301 and 302 between an input 303 and a decision-making block 304. The path 301 may include five sequentially dependent layers, and the path 302 may include four sequentially dependent layers. For the example neural network 300 depicted in FIG. 3, the path 302 is a critical path through the neural network 300 that limits the overall throughput of the neural network 300. That is, the computations and processes along the path 302 take longer to complete than the computations and processes along the path 301. Causal resource profiling may initially determine a baseline execution time through the critical path 302 based on a baseline allocation of computing resources. A baseline execution time through each of the other paths of the neural network 300 may also be determined based on the baseline allocation of computing resources. The allocation of the computing resources may be varied to the different layers in the critical path to determine how variations in computing-resource allocations affect the execution time of the critical path.

Causal resource profiling involves mappings between resource allocation and execution time because execution time of a layer of a neural network depends on resource allocation. For example, a 20% speedup of a particular function (i.e., layer) in the critical path 302 may potentially improve (i.e., reduce) the overall runtime of a neural network application 300 by 5%.

Causal resource profiling may be extended to also analyze other paths of a multipath neural network to determine how varying computing resources allocated to the different layers of the various paths of the multipath neural network may vary the execution time associated with the critical path. Allocating fewer device cores for a particular layer of the neural network may increase execution time for that layer, but may advantageously free computing resources for advantageously reducing execution time of another layer in another path.

In one embodiment, a plurality of simulations may be run to determine a performance of a multipath neural network based on different computing-resource allocations to the different layers and paths of the neural network. An optimum resource allocation may be determined based on estimated execution times for the neural network for the different computing-resource allocations.

Figure 4A:
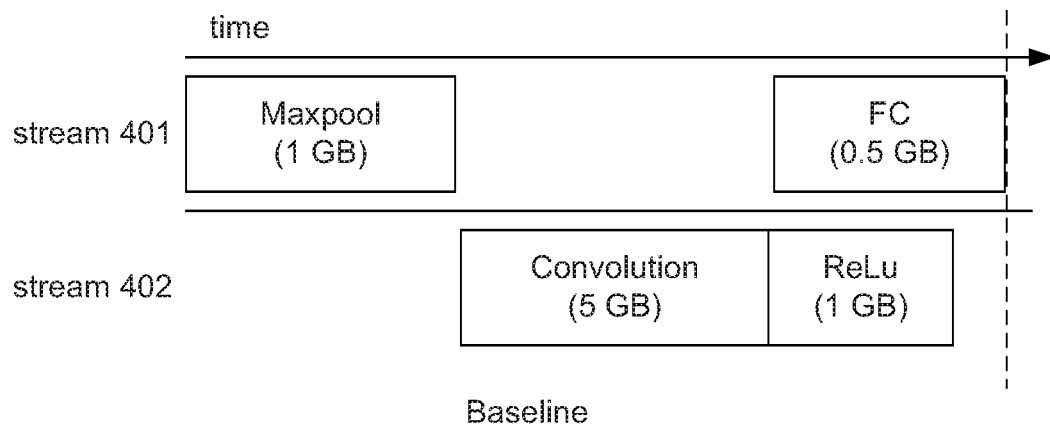
FIG. 4A depicts relative baseline execution times and sequences of a part of two example paths through a multipath neural network.

FIG. 4A depicts relative baseline execution times and sequences of a part of two example paths through a multipath neural network. A first stream of data 401 is executed by a series of layers (functions) (i.e., a maxpool layer and a fully connected (FC)) representing a first path through a multipath neural network. A second stream of data 402 is executed by a series of layers (i.e., a convolution layer and a rectified linear unit (ReLu) layer) representing a second path through the neural network. Although neither path is identified as a critical path, FIG. 4A depicts that the upper path takes longer to completes execution (dashed line) than the lower path.

Each of the layers or functions in FIG. 4A includes an indicated memory computing resource that has been allocated to the function of the layer. For example, the maxpool layer has been allocated 1 GB of memory. The FC layer has been allocated 0.5 GB. The convolution layer has been allocated 5 GB, and the ReLu layer has been allocated 1 GB. Consider for this example that a maximum of 5 GB of memory may be allocated to any layer in any path. Thus, the memory allocation depicted in FIG. 4A results in no layers in either of the two paths being executed concurrently with the convolution layer because all of the available 5 GB of memory have been allocated to the convolution layer.

Figure 4B:
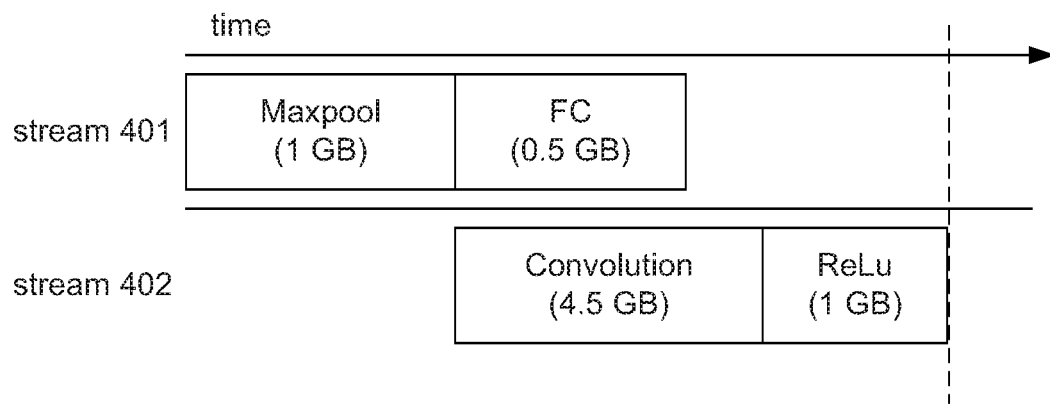
FIG. 4B depicts relative execution times and sequences for both paths in which the convolution layer has been allocated 4.5 GB.

FIG. 4B depicts the relative execution times and sequences for both paths in which the convolution layer has been allocated 4.5 GB. By reducing the amount of memory allocated to the convolution layer in the lower path (stream 402) by 10% from the baseline allocation (FIG. 4A), the FC layer in the upper path (stream 401) may be executed simultaneously with the convolution layer. The overall execution time (dashed line) of the multipath neural network (i.e., both paths) may also be reduced because the FC layer may now be executed concurrently with the convolution layer because 0.5 GB of memory is available to execute the FC layer.

Figure 4C:
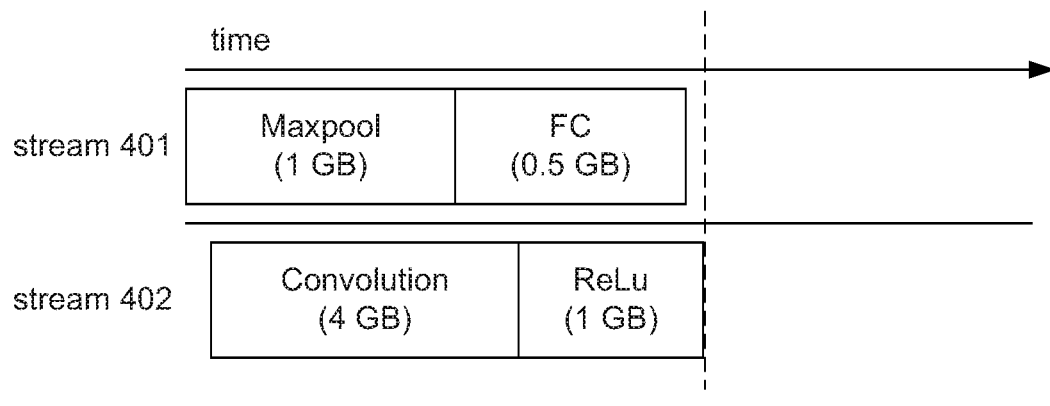
FIG. 4C depicts relative execution times and sequences for both paths in which the convolution layer has been allocated 4.0 GB of memory.

FIG. 4C depicts relative execution times and sequences for both paths in which the convolution layer has been allocated 4.0 GB of memory. By reducing the amount of memory allocated to the convolution layer in the lower path (stream 402) by 20% from the baseline (FIG. 4A), the maxpool layer in the upper path (stream 401) may be executed concurrently with the convolution layer in the lower path. Additionally, the FC layer in the upper path may be executed concurrently with the convolution layer when the maxpool layer completes. The ReLu layer in the lower path may be executed concurrently with the FC layer when the convolution layer completes. The overall execution time (dashed line) of the multipath neural network (i.e., both paths) may be further reduced by reducing the allocation of memory to the convolution layer. Though not specifically shown in the depictions of FIGS. 4B and 4C, the convolution layer may take a little longer to execute based on the reduced memory allocation, but the overall execution time for both paths may be significantly reduced. The example reduction in memory allocation to the convolution layer may be statically applied to the neural network so that each subsequent instantiation of the multipath neural network runs with the overall reduced execution time. Alternatively, the example reduction in memory allocation may be dynamically determined and applied to the current instantiation of neural network to account for network changes, such as changes in topology, inputs, batch size, etc.

A cost model may be used for causal resource profiling of commonly used layers in neural networks that relates execution time of each layer to computing resource utilization. Computing resources that may be considered during causal resource profiling may include device compute units, memory space and memory bandwidth. For CPU compute units, the number of cores may be considered. For GPU compute units, the number of streaming multiprocessors (SM) may be considered. For FPGA, the area of the FPGA may be considered. The units of resource allocation may typically be discrete values (e.g. number of cores, memory/workspace for different implementations of a layer).

One definition that may be used for a causal resource-profile performance analysis of a multipath neural network may be as follows. For the input to a multipath neural network, k streams of executions are respectively input to k paths of the multipath neural network. For each respective stream s, there are $n_s$ sequentially dependent layers l. For each layer l in a path, there are $m_l$ different implementations. Each implementation has an execution time $t_{m,l,k}$ and a set of resources for utilization $\{w_r | r \in \text{Resources}\}$. The goal of the definition is to find the parallel scheduling and implementation of all layers that minimize the overall execution time of the multipath neural network, as in Eq. (1).

$$\text{For } \forall t \in \mathbb{R}, \forall r \in \text{Resources}, \Sigma_{l=1}^{K} w_{r,l} \cdot \alpha_{l,t} < M_r, \quad (1)$$

in which K is a total number of layers, $w_{r,l}$ is utilization of resource r by layer l, $M_r$ is maximum available resource r available for execution of the multipath neural network, and $\alpha_{l,t}$ is 1 if layer l is executing at time t, and 0 if not.

Several heuristics may be used to reduce the complexity of resource allocations. For example, the search space may be pruned. For example, an implementation i for a layer l may be pruned if there exists another implementation j for this layer in which $t_i > t_j$ and $\forall r \in \text{Resources}, w_{r,i} > w_{r,j}$. Implementations may also be pruned having relatively long execution times. For example, an implementation k for layer L may be pruned if $t_k > \beta \times \min\{t_i | i \in \text{layer L implementations}\}$ because long running implementations are unlikely to be part of an optimal solution even though such implementations may provide a relatively small resource utilizations.

Another technique to reduce the complexity of resource allocations may be to use a window-based resource allocation of layers. That is, a window, or grouping of layers, may be formed based on an average or nominal execution time of the layers in each path and depth of the network. The window size for each stream, or layer, may include tunable parameter. The window may be controlled to slide along the paths of a multipath neural network, and a performance analysis of layers internal to the window may be performed to find the optimal resource allocation.

Figure 5:
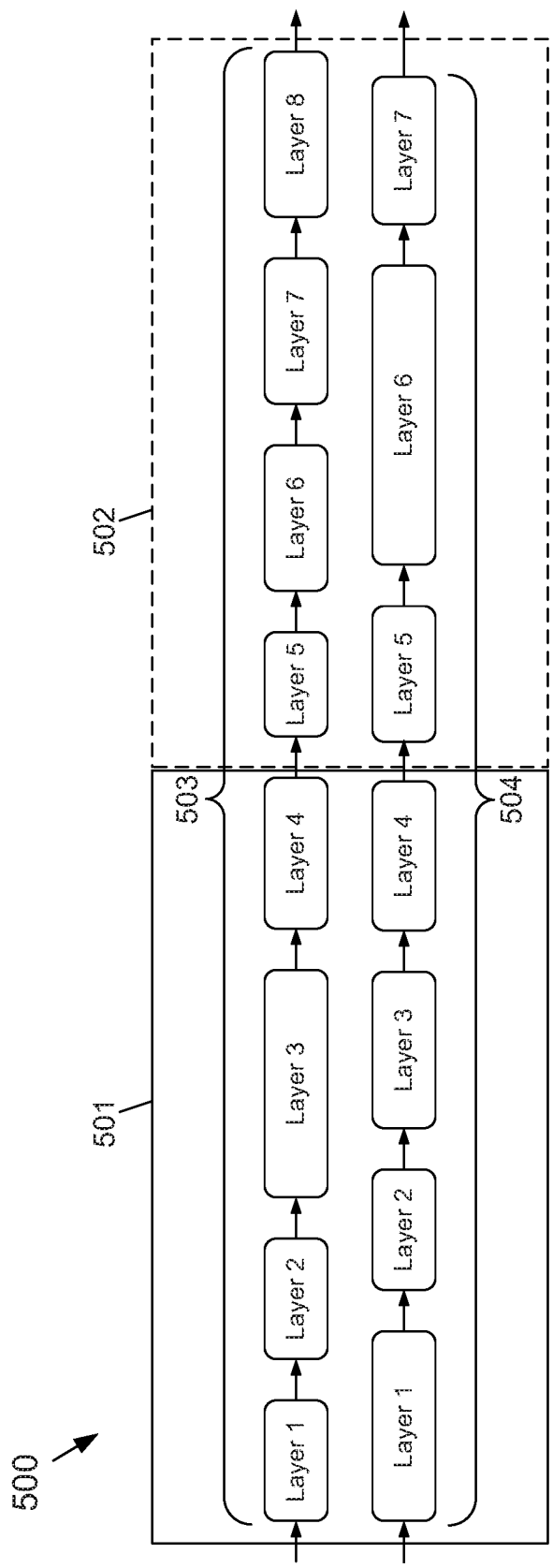
FIG. 5 depicts an example of a window-based resource allocation analysis of layers according to the subject matter disclosed herein.

FIG. 5 depicts an example of a window-based resource allocation analysis of layers 500 according to the subject matter disclosed herein. As depicted in FIG. 5, a first window 501 may be defined and used to perform a causal resource profile analysis between the layers of a first path 503 and a second path 504 of a multipath neural network. A second window 502 may be similarly defined to perform another causal resource profile analysis between the layers of the first path 503 and the second path 504. Execution time of each stream may be matched as best possible within the same window to fully achieve concurrent execution.

Figure 6:
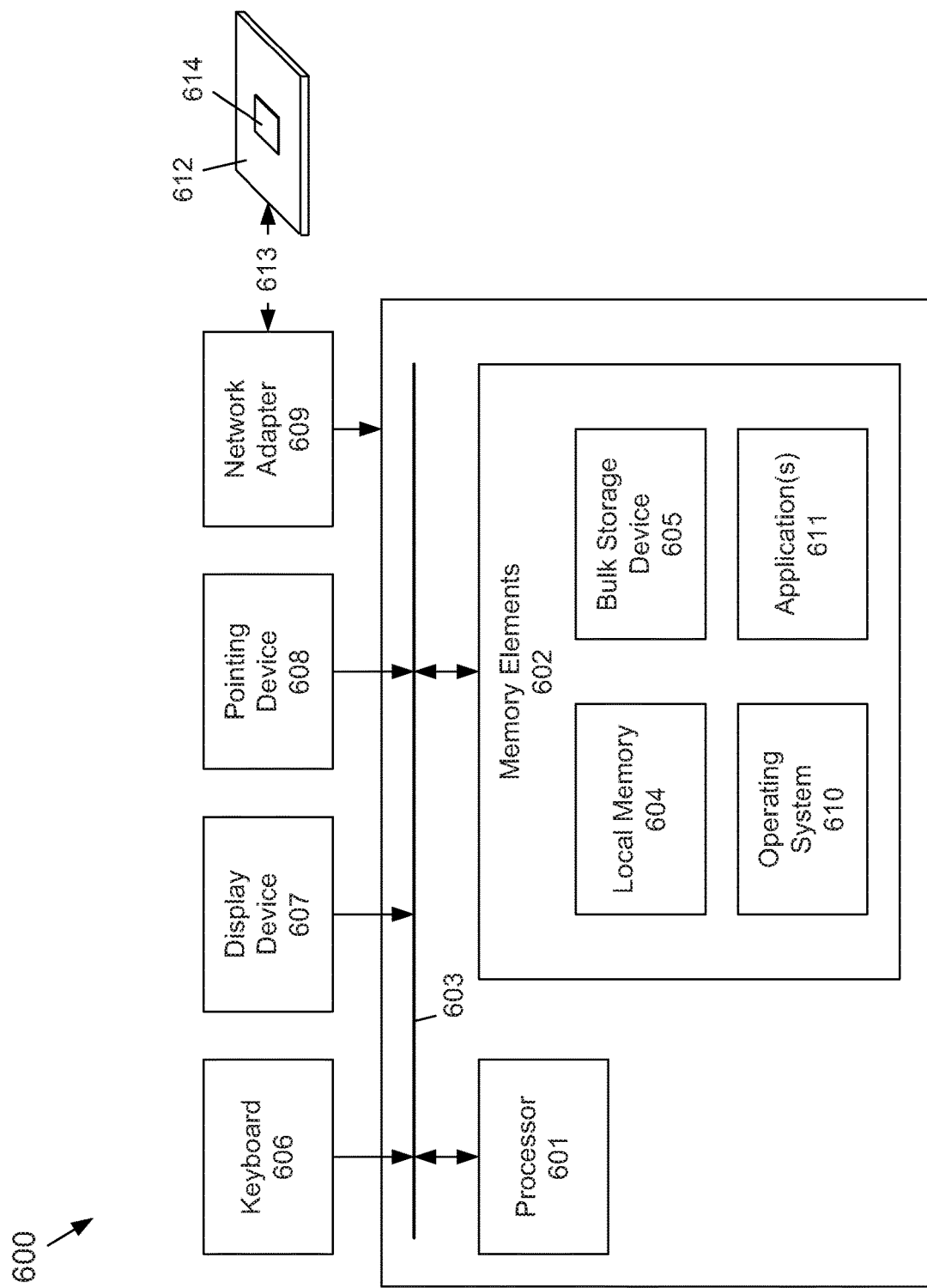
FIG. 6 depicts a block diagram of an exemplary architecture for a data processing system that may be used to implement multipath neural network analyzer of FIG. 1 according to the subject matter disclosed herein.

FIG. 6 depicts a block diagram of an exemplary architecture 600 for a data-processing system. In one embodiment, the architecture 600 may be used to implement the analyzer 100 of FIG. 1. In another embodiment, the architecture 600 may be used to implement the analyzer 100 and to run the optimized multipath neural network provided by the analyzer 100.

The architecture 600 includes at least one processor, e.g., a central processing unit (CPU) 601 coupled to memory elements 602 through a system bus 603 or other suitable circuitry. The architecture 600 may store program code within the memory elements 602. The processor 601 may execute the program code accessed from the memory elements 602 via system bus 603. As such, processor 601 may serve as a special processor. The memory elements 602 may include one or more physical memory devices such as, but not limited to, a local memory 604 and one or more bulk storage devices 605. The local memory 604 may be a random access memory (RAM) or other non-persistent memory device(s) generally used during actual execution of the program code. The bulk storage device 605 may be implemented as a hard disk drive (HDD), solid-state drive (SSD), and/or other persistent data storage device. The architecture 600 may also include one or more cache memories (not shown) that provide temporary storage of at least some program code in order to reduce the number of times program code must be retrieved from bulk storage device 605 during execution.

The architecture 600 may also include input/output (I/O) devices, such as a keyboard 606, a display device 607, and/or a pointing device 608 that may optionally be coupled to the architecture 600. In some embodiments, one or more of the I/O devices may be combined as in a touchscreen that is used as display device 607. Such a display device 607 may also include a keyboard 606 and pointing device 608. One or more network adapters 609 may also be coupled to the architecture 600 to enable the architecture 600 to become coupled to other systems, computer systems, remote printers, and/or remote storage devices through intervening private or public networks. Modems, cable modems, Ethernet cards, and wireless transceivers are non-limiting examples of different types of network adapters that may be used with the architecture 600. Depending upon the particular device implemented with the architecture 600, the specific type of network adapter, or network adapters may vary as the case may be. The I/O devices may be coupled to the architecture 600 either directly or through intervening I/O controllers.

As depicted in FIG. 6, the memory elements 602 may store an operating system 610 and one or more applications 611. In one aspect, the operating system 610 and the application(s) 611, being implemented in the form of executable program code, may be executed by the architecture 600. As such, the operating system 610 and the application(s) 611 may be considered an integrated part of the architecture 600. The operating system 610, the application(s) 611, and any data items used, generated, and/or operated upon by the architecture 600 may be functional data structures that impart functionality when employed as part of a system implemented using the architecture 600.

In one arrangement, an application 611 may include one or more modules that when executed by a system using the architecture 600 or an architecture similar to the architecture 600, may perform the various operations and functions described herein with reference to FIGS. 1-5. The one or more modules may include software, firmware and/or hardware that provide functionality described herein in connection with the various components and/or functional blocks.

In another arrangement, the architecture 600 may be coupled to a platform 612 through a communication link 613. In one example, the architecture 600 may be coupled to the platform 612 through a network adapter 609. In another example, the architecture 600 may include one or more other I/O devices, such as Universal Serial Bus (USB) interface, or other communication port, that may be used to couple the architecture 600 to the platform 612. The platform 612 may be a circuit board and have a neural network accelerator 614 coupled thereto. In one arrangement, the neural network accelerator 614 may be implemented as an integrated circuit (IC) or a plurality of ICs. For example, neural network accelerator 614 may be implemented as one or more programmable ICs, such as field programmable gate arrays, one or more application-specific ICs (ASICs), or the like.

Architecture 600 may be configured to perform the operations described herein on a multipath neural network to allocate computing resources to different layers in different paths of the multipath neural network, such as the multipath neural network 101 in FIG. 1. That is, the architecture 600 may receive the multipath neural network 101 through an I/O device, operate on one or more layers of the multipath neural network, and output an optimized computing resource configuration for the multipath neural network according to the subject matter disclosed herein. The architecture 600 further may provide a definition of the optimized multipath neural network 101 to neural network accelerator 614 for execution therein.

FIG. 6 is provided for purposes of illustration only and, as such, is not intended as a limitation of the inventive arrangements described herein. In some cases, the particular system implemented using the architecture 600 may include fewer components or more components than shown. Further, the particular operating system and/or application(s) included as part of the architecture 600 may vary.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A neural network, comprising:
   at least one processor;
   a first path comprising a first layer; and
   a second path comprising a second layer, the second path connected in parallel with the first path, wherein:
   the first path executes a first data stream,
   the second path executes a second data stream,
   a first allocation of computing resources is allocated to the first layer,
   a second allocation of computing resources is allocated to the second layer,
   the neural network executes at a first performance level based on the first allocation and the second allocation,
   the second allocation comprises a first portion and a different second portion,
   the first portion of the second allocation is transferred from the second layer to the first layer, and
   based on the first layer using the first allocation and the first portion of the second allocation to execute the first data stream and the second layer using the second portion of the second allocation to execute the second data stream, at least a portion of an execution of the first layer overlaps at least a portion of an execution of the second layer and the neural network executes at a second performance level greater than the first performance level.

2. The neural network of claim 1, wherein the first allocation for the first layer is updated based on an execution of the neural network.

3. The neural network of claim 1, wherein the first allocation for the first layer comprises one or more of a number of compute unit cores, a memory size, or a memory bandwidth.

4. The neural network of claim 1, wherein the first path includes a layer that provides a convolution function.

5. A method comprising:
   determining a first allocation of computing resources to a first layer of a first path of a neural network, wherein the first path executes a first data stream;
   determining a second allocation of computing resources to a second layer of a second path of the neural network, the second allocation comprising a first portion and a different second portion, the second path connected in parallel with the first path, wherein the second path executes a second data stream; and
   transferring the first portion of the second allocation from the second layer to the first layer;
   wherein:
   the neural network executes at a first performance level based on the first allocation and the second allocation; and
   based on the first layer using the first allocation and the first portion of the second allocation to execute the first data stream and the second layer using the second portion of the second allocation to execute the second data stream, at least a portion of an execution of the first layer overlaps at least a portion of an execution of the second layer and the neural network executes at a second performance level greater than the first performance level.

6. The method of claim 5, further comprising updating the first allocation of resources for the first layer of the first path based on an execution of the neural network.

7. The method of claim 5, wherein the determining the second allocation is based on receiving a selection of at least a portion the second allocation from a user of the neural network.

8. The method of claim 5, wherein the first allocation comprises one or more of a number of compute unit cores, a memory size, or a memory bandwidth.

9. The method of claim 5, wherein the first path comprises a convolution function.

10. A neural network analyzer, comprising:
    an interface that receives a neural network, the neural network comprising a first path comprising a first layer and a second path comprising a second layer, the second path connected in parallel with the first path, wherein the first path executes a first data stream and the second path executes a second data stream; and
    a processing device that generates a first allocation of computing resources for the first layer and a second allocation of computing resources for the second layer, the second allocation comprising a first portion and a different second portion;
    wherein:
    the neural network executes at a first performance level based on the first allocation and the second allocation;
    the processing device performs a transfer of the first portion of the second allocation from the second layer to the first layer; and
    based on the first layer using the first allocation and the first portion of the second allocation to execute the first data stream and the second layer using the second portion of the second allocation to execute the second data stream, at least a portion of an execution of the first layer overlaps at least a portion of an execution of the second layer and the neural network executes at a second performance level greater than the first performance level.

11. The neural network analyzer of claim 10, wherein the first allocation comprises one more of a number of compute unit cores, a memory size, or a memory bandwidth.

12. The neural network analyzer of claim 10, wherein the processing device generates a third allocation of computing resources for a third layer of the first path.

13. The neural network analyzer of claim 12, wherein the processing device generates a fourth allocation of computing resources for the second layer.

14. The neural network analyzer of claim 12, wherein the processing device performs a transfer of at least a third portion of the second allocation from the second layer to the third layer.

15. The neural network analyzer of claim 10, wherein an operation of the neural network is based on the first allocation.

16. The neural network analyzer of claim 10, wherein the processing device updates the first allocation based on an execution of the neural network.

* * * * *